US007113538B1

United States Patent
Chen et al.

(12) United States Patent
(10) Patent No.: US 7,113,538 B1
(45) Date of Patent: Sep. 26, 2006

(54) TIME DIVERSITY SEARCHER AND SCHEDULING METHOD

(75) Inventors: Xixian Chen, Nepean (CA); Runbo Fu, Nepean (CA); Xin Jin, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 1000 days.

(21) Appl. No.: 09/702,768

(22) Filed: Nov. 1, 2000

(51) Int. Cl.
*H04B 1/707* (2006.01)
(52) U.S. Cl. ...................................... 375/150
(58) Field of Classification Search ................ 375/142, 375/144, 148, 150, 267, 299, 346, 347; 370/320, 370/342
See application file for complete search history.

(56) References Cited

U.S. PATENT DOCUMENTS 6,320,898 B1 * 11/2001 Newson et al. ............. 375/144
6,601,078 B1 * 7/2003 Bondarowicz et al. ...... 708/422
6,621,858 B1 * 9/2003 Sourour et al. ............. 375/150
6,724,845 B1 * 4/2004 Banerjee ..................... 375/350

* cited by examiner

*Primary Examiner*—Kevin Kim

(57) ABSTRACT

Methods, searchers, base stations are provided which search for known codes contained in signals received over wireless channels, from mobile units for example. A coherent correlation is performed between an expected known code, and portions of the received signal during periods which are separated in time. Advantageously, by making the correlation periods separated in time, time diversity is realized such that if one or more of the correlation periods exist while the signal is of poorer quality, for example due to a fade, the remaining correlation periods may still yield a meaningful search statistic. Searching is done during time slots defined with reference to system time, not mobile unit time. Advantageously, this makes the searcher design simpler and more efficient. By performing time diversity searching in this manner, search tasks for one mobile unit(s) can be performed between the search task periods for another mobile unit resulting in a more efficient utilization of searcher resources.

38 Claims, 8 Drawing Sheets

TIME DIVERSITY SEARCHER AND SCHEDULING METHOD

FIELD OF THE INVENTION

This invention relates to CDMA communication systems and methods, and more particularly to methods of searching for a mobile unit's code offset in such systems.

BACKGROUND OF THE INVENTION

In communication systems employing Code Division Multiple Access (CDMA) in accordance with the cdma2000 standard, a mobile unit transmits encoded data over one or more data channels. The data are encoded by the mobile unit using orthogonal Walsh codes, one Walsh code for each data channel. The mobile unit also transmits an encoded pilot signal over a pilot channel. The pilot signal consists of a series of bits having a value of "1". The pilot channel is encoded by the mobile unit using a Walsh code orthogonal to the Walsh codes used for encoding the data, usually the all "0"s Walsh code. The data channels and the pilot channel are then further encoded using a code unique to the mobile unit. The unique code is generated using a unique offset within a long Pseudo-random Number (PN) sequence, the PN sequence being known by a Base station transceiver system (BTS) with which the mobile unit is communicating. The encoded channels are then transmitted as a signal containing a single stream of chips. In signals conforming with cdma2000, the stream of chips is arranged in CDMA frames 20 ms in length. Each CDMA frame contains sixteen Power Control Groups (PCGs), each PCG contains four slots, and each slot contains 384×N chips, where N is a rate multiplier.

The pilot channel may also contain power control information for signalling transmission power level information. The power control information is typically contained in the last slot in each PCG, and this last slot is referred to as a Power Control Slot (PCS).

Referring to FIG. 1, a communication system is shown. A mobile unit 100 is located a distance 102 from a Base station transceiver system (BTS) 104. The distance 102 generally varies with time due to movement of the mobile unit 100. The mobile unit 100 transmits a transmitted signal which propagates along a shortest path 106 to the BTS 104. Due to reflections off obstacles such as buildings, the transmitted signal may also arrive at the BTS 104 after propagating along additional, longer paths 108 (only one shown).

A receiver at the BTS receives a received signal consisting of the signal transmitted by the mobile unit, multipath contributions of the signal transmitted by the mobile unit, and signals transmitted by other mobile units. The BTS attempts to locate the mobile unit's data channel or channels within the received signal by locating the mobile unit's pilot channel. The Walsh code used to encode the mobile unit's pilot channel is the all "0"s Walsh code. Furthermore the pilot signal consists of a series of bits having a value of "1". The encoded pilot signal therefore consists of a series of chips equal to the mobile unit's unique code, other than chips within PCSs. The BTS can locate the mobile unit's pilot channel within the received signal by searching for correlations between the received signal and the mobile unit's unique code, which is known by the BTS.

If the communication system employs Code Division Multiple Access (CDMA), the transmitted signal will consist of CDMA frames. Referring to FIG. 2, the structure of a CDMA frame 10 is shown. The CDMA frame 10 is 20 ms in length and consists of sixteen Power Control Groups (PCGs) 12 labelled PCG 1 through PCG 16. Each PCG 12 consists of four slots 14 of 384×N chips each, where N is a rate multiplier, assumed for now to have a value of one. The transmitted signal includes data components and a pilot channel component, separated by orthogonal Walsh codes. The data and pilot channel are independently recoverable by multiplying a received signal by the respective Walsh code. More particularly, the orthogonal Walsh codes are such that by multiplying the received signal by a Walsh code and accumulating over the length of the Walsh code, components modulated by other Walsh codes sum to zero and are removed. In cdma2000, the pilot channel is assigned a Walsh code of all zeros. Accumulating the received signal directly will therefore remove all data components, leaving the pilot channel component. The pilot channel contains known content in the form of pilot channel symbols (typically all ones) in the first three slots of each PCG, and contains power control information in the fourth slot of each PCG. This fourth slot is referred to as a Power Control Slot (PCS). The power control slot is used to carry an all "1"s power control signal for a power up command, or an all "0"s power control signal for a power down command.

A searcher, which is a functional block within the BTS 104 attempts to locate a unique code of the mobile unit 100 within a received signal received at the BTS 104. The received signal is composed of the transmitted signal from the mobile unit 100, including multipath contributions, and transmitted signals from other mobile units. The searcher measures correlations between the unique code of the mobile unit 100 and the received signal. Since the pilot channel has a Walsh code of all zeroes, performing a correlation directly on the received signal is equivalent to performing a correlation between the pilot channel multiplied by the mobile unit's unique code, and the contributions of the data channels are removed.

The searcher is a functional block in all CDMA receivers whose purpose is to detect an access request of a mobile or to search for multipath components over a certain search window. It correlates a received signal with the locally generated PN code defined by the system time for all possible delay offsets specified in the search window. The search results are accumulated over the total correlation interval. The search results are "fingers" to new or existing multipath components. There are two types of search functions: access searcher and traffic searcher. After having successfully completed the forward link synchronization, a mobile terminal enters the cell network by sending a request on a common unlink access channel according to a Slotted ALOHA scheme. An access request contains a preamble made of a un-modulated pilot followed by an encapsulated message. The access searcher function performs the first detection of a user in the cell so as to determine an access request has been made by a mobile. After completing the access searcher function, the network assigns a traffic channel to the mobile. Then the traffic searcher function is performed to search for multipath components over a certain search window so as to maintain the traffic channel which has already been established.

There are two stages for the traffic search: preamble search and demodulation search. To assist the base station in initial acquisition of the user's signal, the mobile will send a preamble pilot signal without power control bit in multiples of 1.25 ms before sending the actual traffic data signals. After acquiring the mobile signal, the base station will inform the mobile to send the actual data signals as well as the pilot signal with power control bit. The base station then begins to do the demodulation search.

There are basically two methods to do the correlations:

Method One: The despreading code is fixed. The correlation result for each offset is obtained by shifting the chip rate samples against the despreading code and the correlation is calculated by the formula $$r(k) = \sum_{n=1}^{N} x(n+k)c(n)$$

where x(n) is the received chip samples, and c(n) is the despreading code. Suppose that the search window size is M and the correlation length is N. This method will require M+N received chip rate samples and length N despreading codes to do the correlations for M chip offsets.

Method Two: The chip rate samples is fixed. The correlation result for each offset is obtained by shifting the despreading code against the chip rate samples and calculate the correlation for each offset by the formula $$r(k) = \sum_{n=1}^{N} x(n)c(n+k)$$

This method will require M+N despreading codes and length N received chip rate samples to do the correlations for M chip offsets.

For the access search and traffic preamble search, since there are no power control bits in the pilot signals, method two is the preferable method to do the correlation. For the traffic demodulation search, since there are power control bits in the pilot signals, method one is the preferable method to do the correlation.

It can be viewed as a FIR filter. Its output is the correlation result for each offset. Since the searching resolution is two samples per chip, we need two such filters to implement the searcher. One is operated on the even chip samples, and the other is operated on the odd chip samples. To simplify the analysis, only the correlation process for even chip samples is dealt with.

Various searcher structures are taught in co-pending application Ser. No. 09/671,254 filed Sep. 28, 2000 entitled "Method and System for Estimating Frequency Offset and Phase Rotation Correction in CDMA Systems" assigned to the same assignee as this application and hereby incorporated by reference.

A current method by which the BTS may search for the mobile unit's code within the stream of chips will be described with reference to FIG. 3. The PN code is aligned with the slot start of the earliest received mobile signal. Then a coherent accumulation 20 is performed over the 384 chips in the first slot in the first PCG. Similarly a coherent accumulation is performed for each of the first 16 slots, i.e. all of the slots in the first four power control groups. These are then non-coherently accumulated 22. If the non-coherently accumulated correlation result for a given offset is above a threshold then the BTS concludes that the mobile unit's pilot channel has been located, and the encoded data can be extracted. The timing of the correlation is important. Searching for a correlation over sixteen consecutive slots requires that the searching be scheduled to begin at a slot boundary of the received signal, in order that the BTS does not evaluate a coherent correlation across any boundaries of PCSs of the mobile unit's signal. A coherent accumulation entirely within a PCS is acceptable because the PCS contains all "0"s or all "1"s. Scheduling of correlation measures to begin at mobile unit slot boundaries is not efficient to implement. Furthermore, when measuring correlations over consecutive slots, there is a risk that the correlations will be measured over a period of low signal strength arising from fading.

SUMMARY OF THE INVENTION

Embodiments of the invention provide methods, searchers, base stations adapted to search for known codes contained in signals received over wireless channels, from mobile units for example. A coherent correlation is performed between an expected known code, and portions of the received signal during periods which are separated in time. Advantageously, by making the correlation periods separated in time, time diversity is realized such that if one or more of the correlation periods exist while the signal is of poorer quality, for example due to a fade, the remaining correlation periods may still yield a meaningful search statistic.

In some embodiments, searching is done during time slots defined with reference to system time, not mobile unit time. Advantageously, this makes the searcher design simpler and more efficient. By performing time diversity searching in this manner, search tasks for one mobile unit(s) can be performed between the search task periods for another mobile unit resulting in a more efficient utilization of searcher resources.

According to one broad aspect, the invention provides a method of searching for multipath components of a CDMA signal. The method consists of, for each of a plurality of correlation periods which are not entirely contiguous, for each of a plurality of multipath delays within a search window determining a corresponding coherent correlation between a portion of the CDMA signal received during the correlation period and a corresponding portion of a known code offset by the multipath delay. The coherent correlations determined for each multipath delay are then combined non-coherently into a search statistic for that multipath delay. To provide an element of time diversity, the correlation periods are not entirely contiguous. For example, consecutive ones of the plurality of correlation periods are each separated by a respective non-zero time interval. In one embodiment, the correlation periods are uniformly spaced.

In some embodiments, to execute the coherent correlations, search task periods are defined with reference to a system time during a search period. For each of the correlation periods, a corresponding search task period is selected during which to determine the corresponding correlations.

For each correlation period, if the correlation period is earlier by a delay period than the corresponding search task period, the portion of the CDMA signal received during the correlation period can be buffered at least as long as the delay period.

In some embodiments, the method is used to search for a known code within a CDMA signal which has a pilot channel having pilot channel slots and power control slots defined with reference to a mobile unit time, mobile unit time being system time delayed by a round trip delay to the mobile unit.

In some such embodiments, the search task periods are selected corresponding with the correlation periods such that the search task periods do not overlap partially with any of the power control slots, and setting the correlation periods to equal the search task periods.

In another such embodiment, the search task periods, correlation periods are defined such that for each search task period of the plurality of search task periods, if the search task period does not overlap partially with any power control slot, the corresponding correlation period is set to equal the search task period; if the search task period overlaps with an end portion of a power control slot, the corresponding correlation period is set to equal a period during which the power control slot is received; and if the search task period overlaps with a start portion of a power control slot, the corresponding correlation period is set to equal a period preceding a period during which this power control slot is received.

In another such embodiment, the search task periods are selected to correspond with the correlation periods such that the search task periods do not overlap with an end portion of any power control slot. If the search task period does not overlap partially with any power control slot, the corresponding correlation period is set to equal the search task period. If the search task period does overlaps with a start portion of any power control slot, the corresponding correlation period is set to equal a period preceding the start of the power control slot.

In yet another such embodiment, the search task periods corresponding with the correlation periods are selected such that the search task periods do not overlap at all with any of the power control slots.

To simplify scheduling of search tasks, the search task periods can be grouped into power control groups of N consecutive search task periods each, where $N \geq 2$. When such is done, time diversity is best achieved by selecting the plurality of search task periods to include at most one search task period from each power control group. For example, the search task periods corresponding with the correlation periods can be selected to consist of an Mth search task period in every power control group, where $1 \leq M \leq N$.

The above embodiments can be adapted to search within a received signal or signals for multipath components received from multiple units. In one embodiment, searcher functionality might be provided which allows a maximum of Q correlations to be determined during each group of Mth search task periods, $Q \geq 1$, and the search task periods for mobile units are selected accordingly. This can be achieved by maintaining a count of how many correlations are to be determined during each search task period, and scheduling a new search by selecting the Mth search task periods with a minimum number of correlations to be determined.

Other embodiments of the invention provide a computer readable medium having stored thereon instructions for causing a computing platform to execute any one of the methods described above.

Another broad aspect of the invention provides a searcher which has a search engine capable of performing Q search tasks during each of a plurality of search task periods defined in local time, where $Q \geq 1$, and which has a scheduler adapted to schedule a search process for each of a plurality of known codes by selecting a respective plurality of search task periods during which the search engine is to execute a search task as part of the search process in a manner such that no more than Q search tasks are scheduled for any search task period.

To perform the scheduling, the searcher in one embodiment has a counter for each search task period maintained by the scheduler identifying how many search tasks have been scheduled for the search task period. The scheduler in such embodiment is adapted to schedule a new search process by selecting search task periods having fewer search tasks scheduled.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

An embodiment of the invention provides a method by which a searcher can schedule slots over which the coherent correlations are to be measured, implemented as any suitable combination of processing hardware, software, and firmware. According to the invention, the searcher measures the correlations over slots defined within a frame of reference of the BTS rather than over slots defined within a frame of reference of the mobile unit. The frame of reference of the mobile unit is temporally offset from the frame of reference of the BTS by an amount equal to the signal propagation time between the mobile unit and the BTS. Slots and PCGs within the frame of reference of the BTS will be referred to as BTS slots and BTS PCGs respectively, and slots and PCGs within the frame of reference of the mobile unit will be referred to as mobile unit slots and mobile unit PCGs respectively. Chips in BTS slots do not contain any data and are used only to define a timing frame of reference, and a BTS PCG has no meaning other than as a grouping of contiguous BTS slots each slot defining a coherent interval as described in detail. The BTS slots do not need to be of the same duration as the mobile unit slots. In one embodiment, BTS slots over which correlations are measured are selected from as many BTS PCGs as possible within the CDMA frame, in order to minimize the likelihood that the correlations will be measured over a period of fading.

Figure 1:
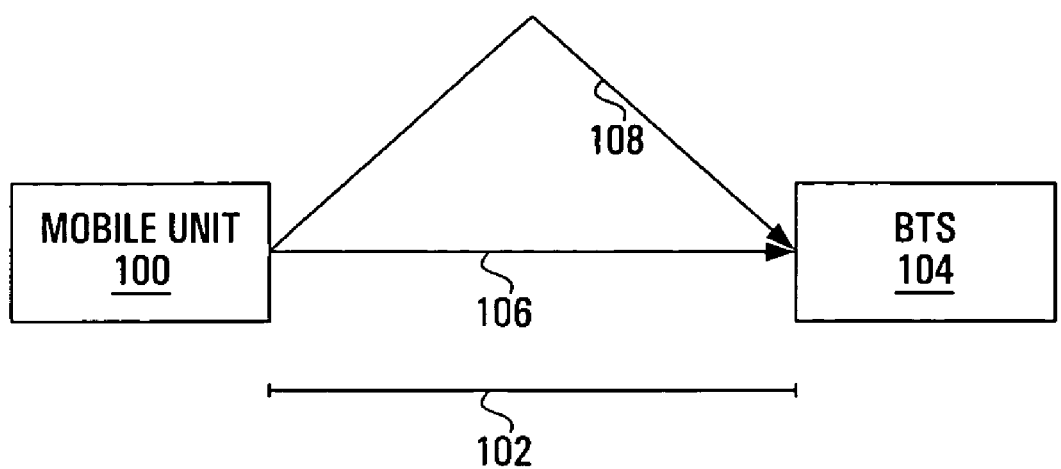
FIG. 1 is a block diagram of a communication system employing Code Division Multiple Access (CDMA)
Figure 2:
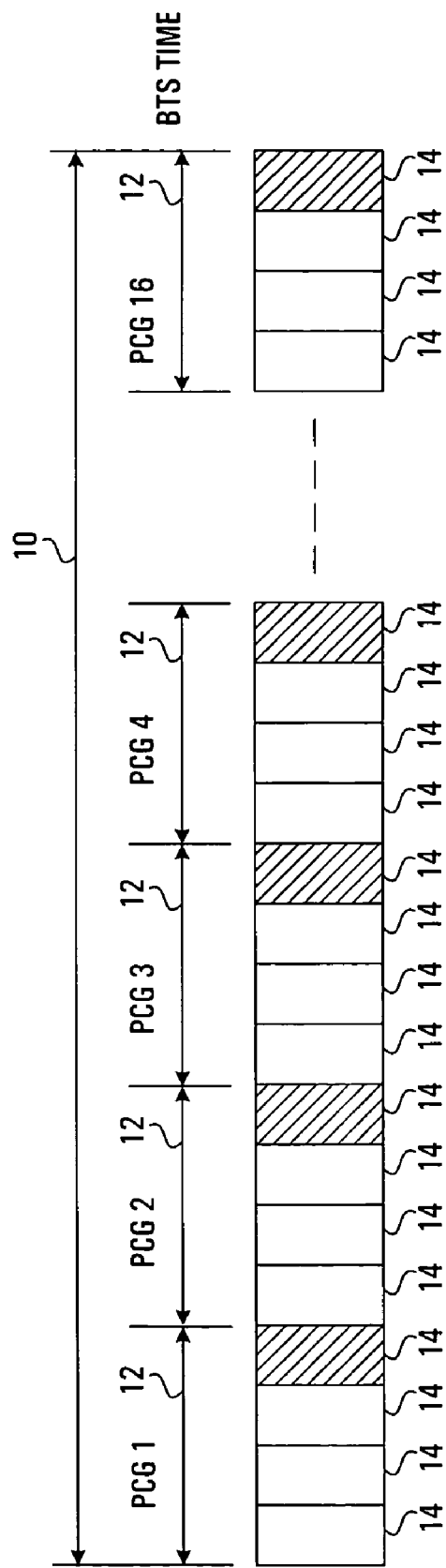
FIG. 2 is a diagram showing the structure of a CDMA frame.
Figure 3:
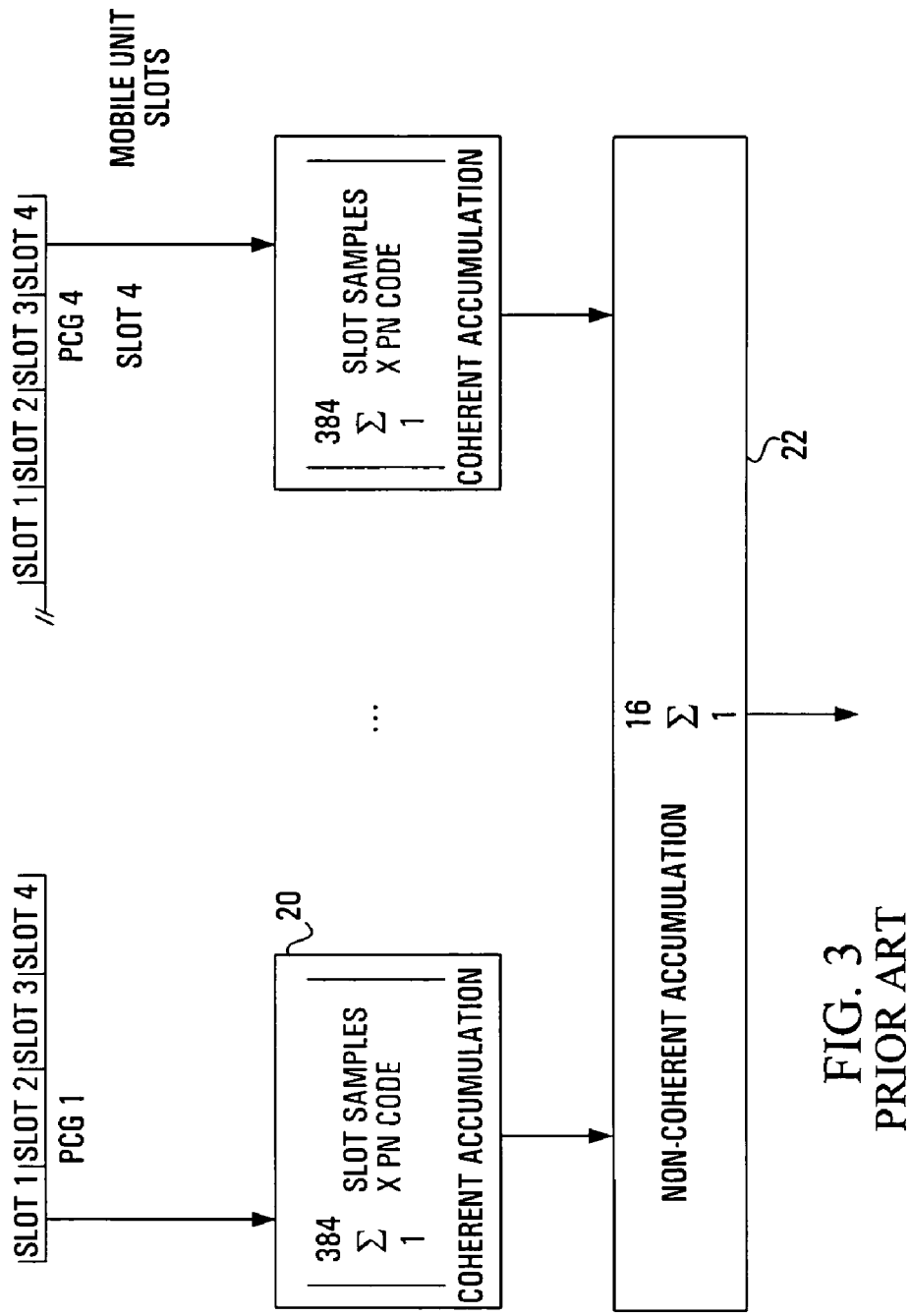
FIG. 3 is a diagram showing a conventional search method.
Figure 4:
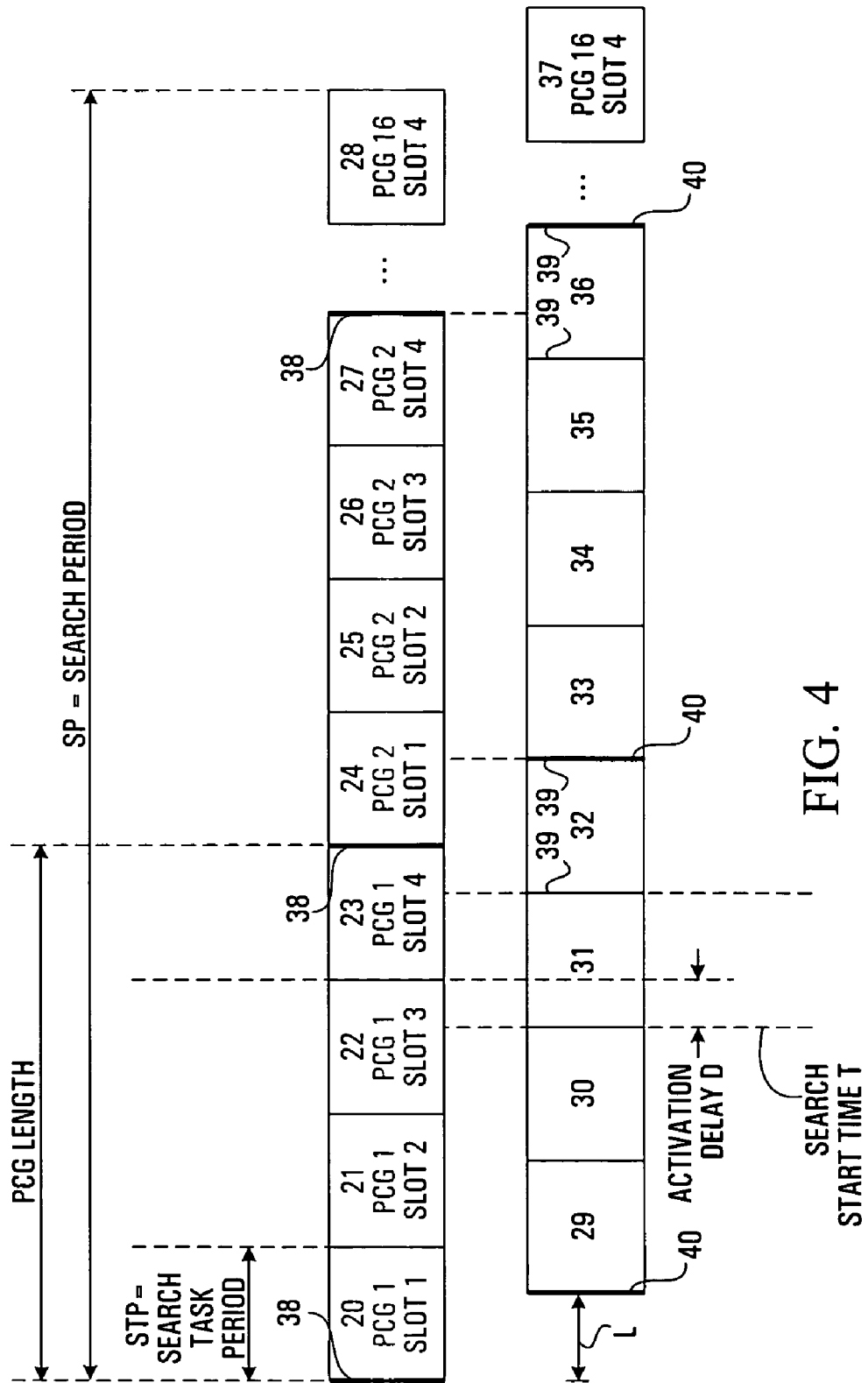
FIG. 4 is a diagram showing alignment of BTS slots and mobile unit slots.

Referring to FIG. 4, an alignment of BTS slots 20 to 28 (only 9 of 64 shown) and mobile unit slots 29 to 37 (only 9 of 64 shown) for the earliest path is shown. In this example, BTS slots and mobile unit slots have the same duration. This example will be used to define several terms. A temporal offset L (expressed in chips) exists between the BTS slots and the mobile unit earliest path slots due to the signal propagation time between the mobile unit and the BTS. PCG boundaries 40 are indicated between some mobile unit PCGs. PCG boundaries 38 are indicated between BTS PCGs. Mobile unit slots 32 and 36 (the fourth slot in each mobile unit PCG) are PCSs and the boundaries separating mobile unit slots 32,36 from adjacent mobile unit slots are PCS boundaries 39. According to the invention coherent correlations are taken only over mobile unit time periods which do not overlap a portion of a PCS because the contents of such a time period, when coherently accumulated, would degrade searcher performance because of possible partial cancellation of the pilot channel signal.

When scheduling BTS slots over which a correlation is to be measured in FIG. 4. In one embodiment, the searcher must avoid BTS slot 23 as the measurement of the correlation between the chips in BTS slot 23 and the corresponding aligned chips in mobile unit slots 31 and 32 would include chips within a PCS, namely mobile unit slot 32. Similarly, the searcher must avoid scheduling measurement of a correlation over BTS slots 24 and 27 and so on. In another embodiment, the searcher uses BTS slot 23, but performs a correlation on the chips of mobile unit slot 31 which are buffered for a period of time D referred to as the activation delay. Furthermore, BTS slot 24 could be used to perform correlation of a delayed version of mobile unit slot 32.

A detailed embodiment of the invention will now be described. With this embodiment, time is divided into search periods of duration SP (in chips) within which an entire search is to be performed. In one embodiment, the search period is equal to one 20 ms CDMA frame. Referring again to FIG. 4, the SP for this example is a 20 ms frame consisting of 16 PCGs, each containing four slots. It is noted that more generally, for the purpose of searching system time can be divided into an arbitrary number of power control groups, each containing an arbitrary number of slots. The slot definition at the base station does not have to be the same size as the length of the power control slot sent by the mobile unit.

Figure 5:
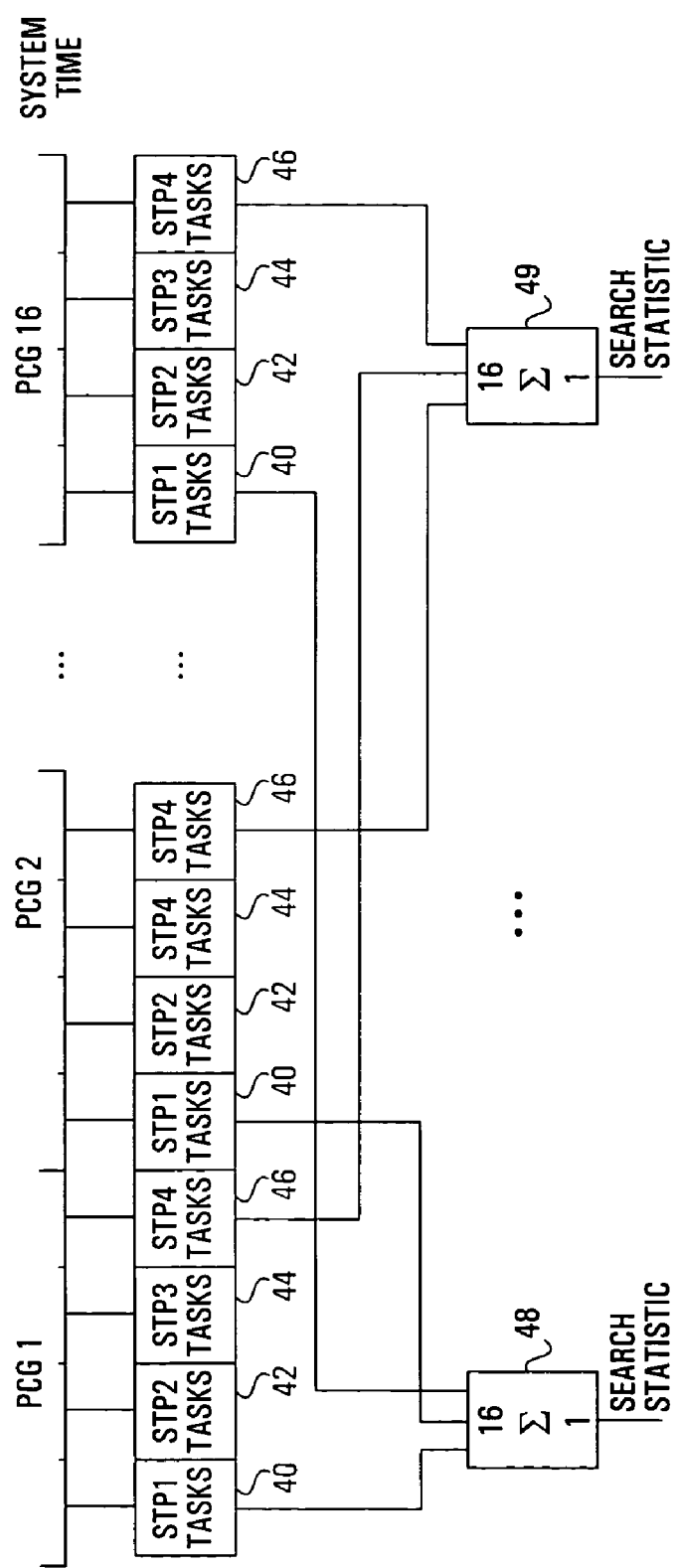
FIG. 5 is a schematic diagram showing how a single correlation result is computed.

The search period SP is divided into search task periods of length STP (in chips). In the example of FIG. 4, the search task period STP is one slot in length. A design parameter is a number of search tasks Q which are to be schedulable during a given search task period. Duplicate hardware is required for each additional search task. The search task period STP is also the coherent correlation length. Referring to FIG. 5, a simplified block diagram of the searcher is shown. System time (BTS time) is shown divided into PCGS 1 through 16, each having four slots or STPs. During each STP a number of search tasks can be performed. During each STP, a coherent correlation between an incoming sequence of chips and a portion of the PN code for the respective mobile unit is calculated. These tasks are indicated generally by STP1 tasks 40, STP2 tasks 42, STP3 tasks 44 and STP4 tasks 46. The same task is performed in the same slot of each PCG. The coherent accumulations of each task for a given search are accumulated non-coherently with a respective accumulator 48,49 (only two shown) the output of which is the search statistic for that search offset. Such a statistic is maintained for each mobile unit code position (or equivalently incoming chip position) within the search window size W. The peaks in this output indicate the positions of the multipath components.

Each search has a respective search start time T. This is the chip position (referenced again to base station time) where the search task is activated. Referring to FIG. 4, a search activation time T is shown if a particular search is to start with a correlation over mobile station slot 31.

Each search task has an activation delay D. This is the number of chips that the search task will be delayed prior to activation (referenced to search start position T in chips). The task will actually start at the time search start position T+search task activation delay D. The delay is introduced such that the search task is schedulable in base station slot time. Referring to FIG. 4, the delay D is shown which shows the delay necessary to enable the correlation of mobile unit slot 31 during base station slot 23.

The window size W is the length of the search window. It is the number of correlation offsets (in half chip units) over which the search task will be calculated. The value of the last offset of the search window (in half chips) equals Path offset(L)+window size(W)−1.

Skip PCGs P is a parameter representing a number of PCGs that is to be skipped between two consecutive coherent correlations for the same search task. If P is zero, then a correlation is performed in the same slot of each PCG for a given search. Referring to FIG. 4, if slot 23 (the fourth slot in PCG 1) is used for a given search, and the skip PCGs parameter P is zero, then the fourth slot of each PCG is used for the search. If P were instead equal to one, then the fourth slot of every second PCG is instead used for the search.

Correlation accumulation number N is the number of coherent correlations that are performed and non-coherently accumulated for one search result.

Figure 6:
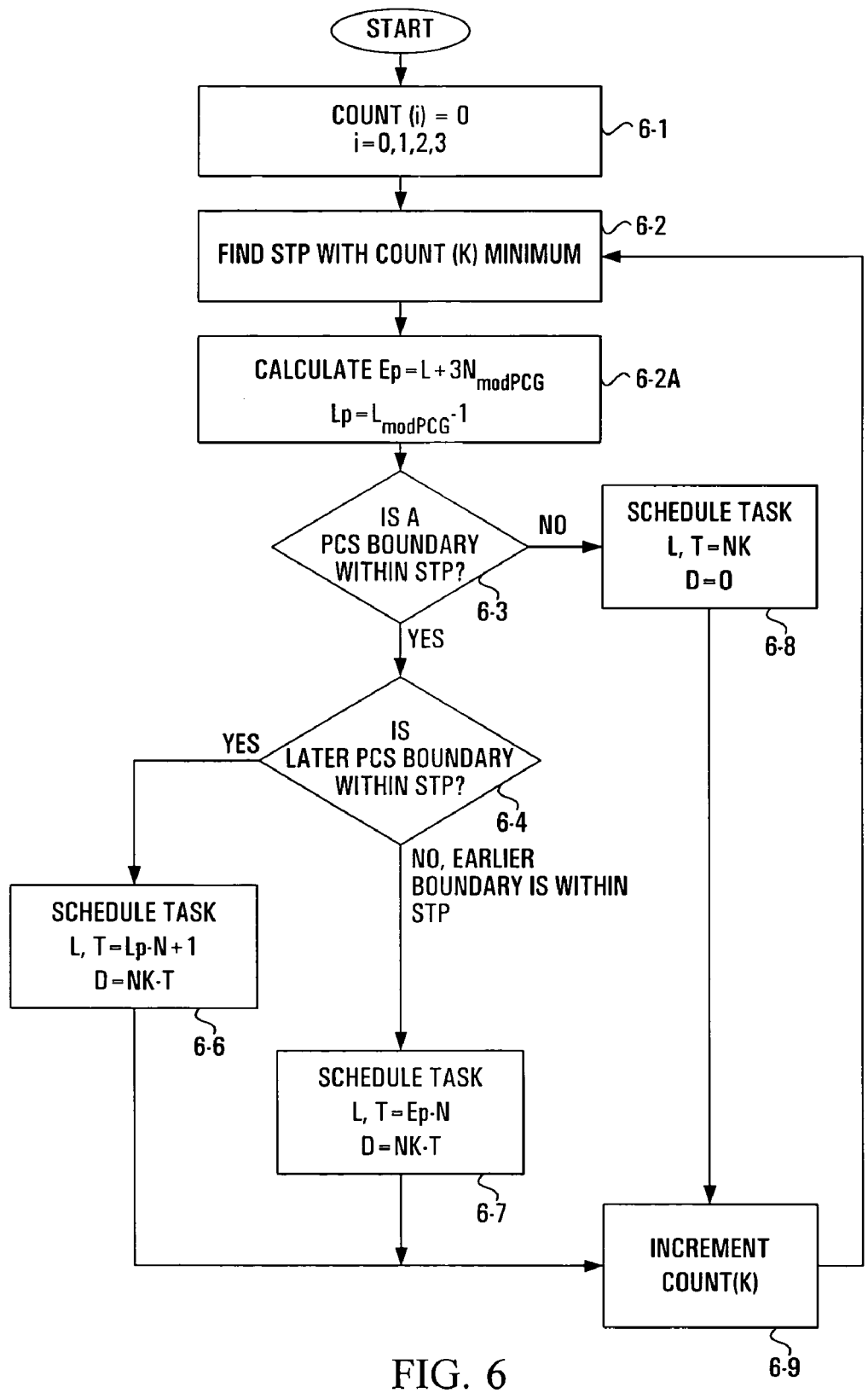
FIG. 6 is a flow chart of an example implementation of a method according to an embodiment of the invention.

Referring to FIG. 6, a scheduling method provided by an embodiment of the invention is shown. For this example it is assumed that the coherent correlation length N is 384, i.e. one slot. It is also assumed that the incoming chip sequence includes power control information in the fourth slot of each mobile unit PCG. Because the correlation length is the same as the length of the power control slot, a correlation can be performed entirely during a power control slot without crossing a PCS boundary. It is noted that if the coherent correlation length were any greater than 384, then necessarily a correlation period including any of the PCS would cross a PCS boundary and as such would be inappropriate for coherent correlation.

The method starts by initializing to zero a count, count(i), for each scheduling task period (step 6-1). This count is the number of search tasks which have been scheduled in each search task period. The maximum number of tasks schedulable for a given STP is a hardware/software design parameter. In this example, it is assumed that there are four scheduling task periods (STPs). The next time a scheduling of a task is to occur the process starting with step 6-2 is carried out. This starts with the identification of the STP K with the minimum number of search tasks scheduled. Next, a determination is made in step 6-3 of whether there is a mobile unit PCS boundary within the STP (recall the STP is in system time, not mobile unit time).

If there is no PCS boundary within the STP (no path, step 6-3) then the search task is scheduled for that STP (at step 6-8). T, the search task activation time, is set to the start of the STP. In chips, this is expressed as T=NK. D, the search activation delay is set to zero since correlation can be performed on the mobile unit chips received during the system slot. N=coherent correlation length is set to 384, P=skipped PCGs is set to zero, and M=correlation accumulation number is set to 16. This means that the search task is performed by executing a coherent correlation over 384 chips the Kth STP of each of the 16 PCGs and these 16 results are non-coherently combined. This task is then performed over a search window size W. The counter count(K) is then incremented at step 6-9.

Figure 7A:
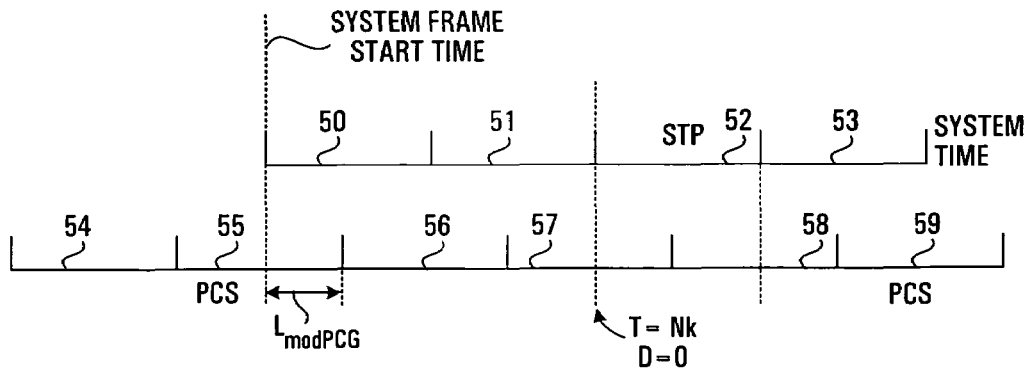
FIG. 7 is a timing diagram for the example of FIG. 6.

An example of this is shown in FIG. 7A. The system slots of a particular PCG are indicated at 50,51,52,53 with slot 52 having been selected as the slot to be scheduled. Slot 52 being the third slot, K=2. Six mobile unit slots 54,55,56,57, 58,59 are shown two of which 55,59 are power control slots (PCS). The mobile unit slots are received by the base station after a delay L. In the event slot 52 is selected as the STP to be scheduled, it can be seen that this overlaps mobile unit slots 57,58 neither of which is a PCS. Therefore correlation can be performed directly over the portions of mobile unit slots 57,58 received during STP slot 52.

If there is a PCS boundary within the STP (yes path, step 6-3) a determination is made at step 6-4 of whether the later PCS boundary is within the STP or the earlier PCS boundary is within the STP.

In order to determine if the mobile PCS boundaries are within the STP or not, the positions of the earlier and the later mobile PCS boundaries Ep,Lp need to be calculated referenced to the system PCG (step 6-2A). Recall that the mobile PCS is the fourth slot of each PCG which precedes the first slot of each following PCG and behind the first slot of the current PCG by three slots. Since the start of the first mobile unit slot in each PCG is simply L modulo PCG length (in chips), the position of the late mobile PCS boundary Lp can be calculated from Lp=L modulo PCG length (in chips)−1. The position of the early mobile PCS boundary Ep can be calculated from Ep=(L+3×N) modulo (PCG length in chips).

If the later PCS boundary is within the STP (yes path, step 6-4), then the search task can be scheduled to perform a correlation over the mobile unit PCS, but delayed to be performed during the Kth system slot. This is because the mobile unit PCS will be ahead of the Kth system slot. In step 6—6, the search task is scheduled for that STP. T, the search task activation time, is set to namely Lp−N+1, which is the start of the mobile unit PCS which is the fourth slot of each PCG. D, the search activation delay is set to NK−T since correlation cannot begin until the start of the STP which occurs at system time NK. As before, N=coherent correlation length is set to 384, P=skipped PCGs is set to zero, and M=correlation accumulation number is set to 16. This means that the search task is performed by executing a coherent correlation over 384 chips during the Kth STP of each 16 PCGs and these 16 results are non-coherently combined. This task is then performed over a search window size W. The counter count(K) is then incremented at step 6-9.

Figure 7B:
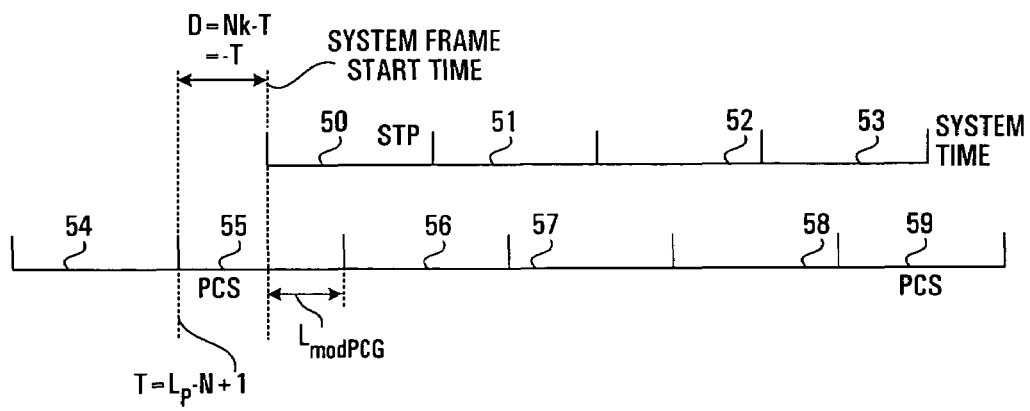

An example of this is shown in FIG. 7B. In this case it is assumed that it is the first slot 50 of the PCG being scheduled, so K=0. It can be seen that this slot overlaps the later PCS boundary of the mobile unit PCS slot 55. Thus, the correlation can be performed over the PCS slot 55, but at a time delayed to occur at the start of the STP slot 50.

Returning now to FIG. 6, if the earlier PCS boundary is within the STP (no path, step 6-4), then the search task can be scheduled to perform a correlation over the mobile unit slot prior to the mobile unit PCS, but delayed to be performed during the Kth system slot. This is because the mobile unit PCS will be behind the Kth system slot and will not be received in time to perform the correlation during the Kth system slot. In step 6—6, the search task is scheduled for that STP. T, the search task activation time, is set to Ep−N, which is the start of the mobile unit slot prior to the mobile unit PCS, this being the third slot of each PCG. D, the search activation delay is set to NK−T since correlation cannot begin until the start of the STP which occurs at system time NK. As before, N=coherent correlation length is set to 384, P=skipped PCGs is set to zero, and M=correlation accumulation number is set to 16. This means that the search task is performed by executing a coherent correlation over 384 chips during the Kth STP of each 16 PCGs and these 16 results are non-coherently combined. This task is then performed over a search window size W. The counter count(K) is then incremented at step 6-9.

Figure 7C:
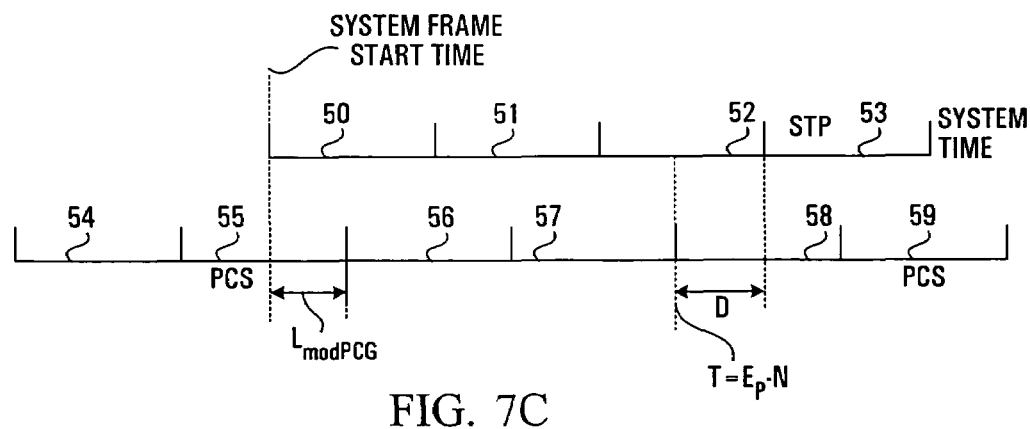
Figure 8:
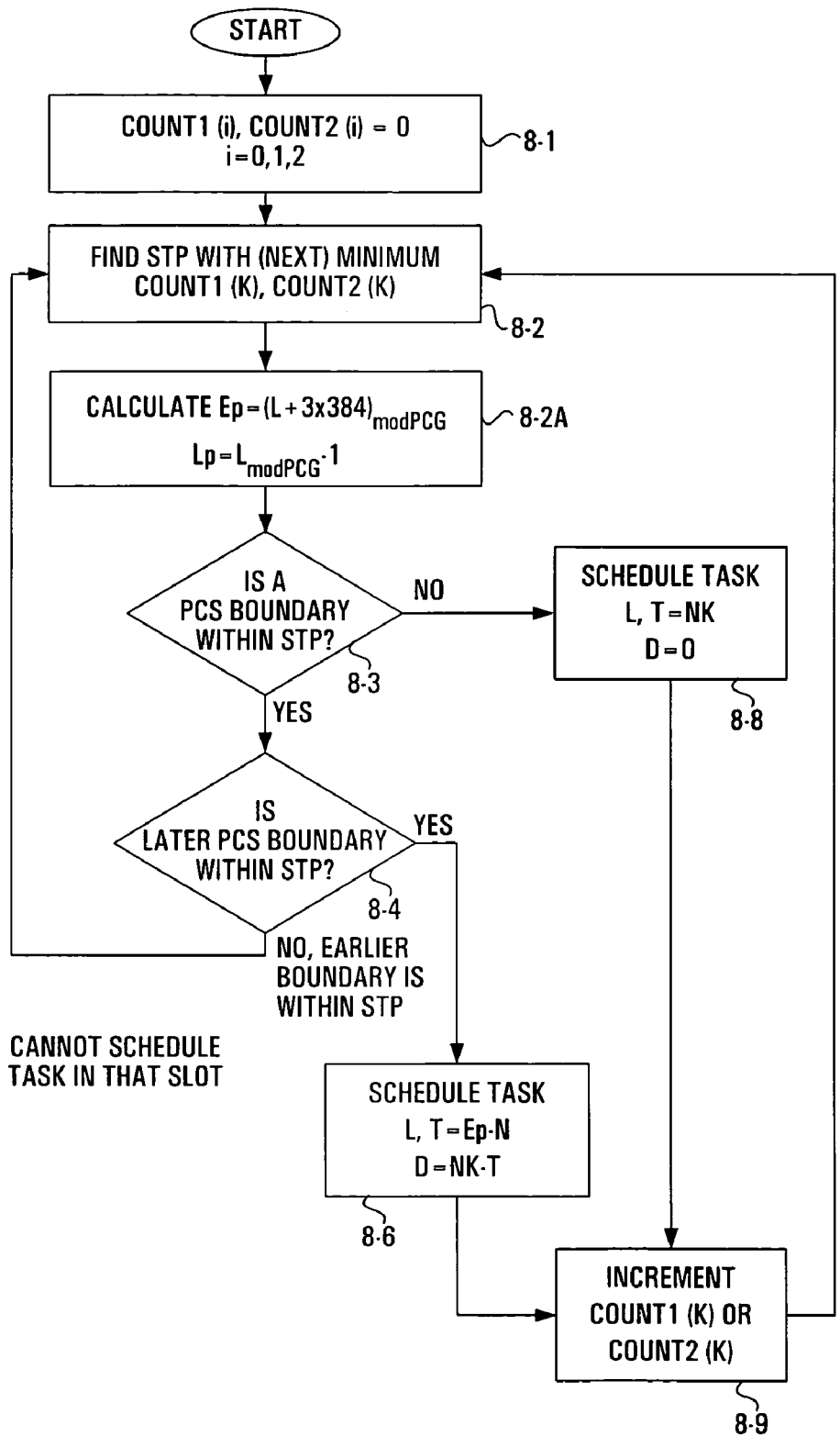
FIG. 8 is a flowchart of an example implementation of a method according to an embodiment of the invention.

An example of this is shown in FIG. 7C. In this case it is assumed that it is the fourth slot 53 of the PCG being scheduled, so K=3. It can be seen that this slot overlaps the earlier PCS boundary of the mobile unit PCS slot 59. Thus, the correlation cannot be performed over the PCS slot 59 because that slot will not be entirely received before or during system slot 53. Thus the slot prior to that, namely mobile unit slot 58 is selected.

In the event the STP duration is longer than the PCS slot size, then it is not possible to schedule a task which overlaps any portion of the PCS. In the event a selected slot overlaps with a later boundary of the PCS slot, that slot cannot be used for that search, unless a very large delay buffer is to be used in processing to perform searching over mobile unit chips received in the slot preceding the PCS slot, and this is not desirable. In the event the selected slot overlaps with the earlier boundary of a PCS slot, that slot can still be used to schedule the task, but with a delay which looks at mobile unit data prior to the PCS slot. This delay will not be as great as is the case when the later PCS boundary is involved. The search task scheduling efficiency is closely related to the search buffer memory size.

A specific example in which the STP duration is longer than the PCS slot size will now be given. In this example, the STP slot size and coherent correlation length N is 512, but the PCS slot size is 384. System time is still comprised of 16 power control groups, each with three slots. The correlation accumulation number N for this case is eight meaning that for a given search, only a slot from every second power control group needs to be dedicated to that search, and thus P=number of skipped PCGs equals one for this case. This also means that there are now six slots within which tasks can be scheduled (over two PCGs) rather than four (over one PCG) as in the previous embodiment. Each PCG has three counts, count1(i), i=0, 1, 2, and count2(i), i=0, 1, 2

The method starts by initializing to zero the counts, count1(i) and count2(i), for each scheduling task period (step 8-1). In this example, it is assumed that there are six scheduling task periods (STPs) over two PCGs. The next time a scheduling of a task is to occur the process starting with step 8-2 is carried out. This starts with the identification of the STP K with the minimum number of search tasks scheduled. Next, a determination is made in step 8-3 of whether there is a mobile unit PCS boundary within the STP (recall the STP is in system time, not mobile unit time).

If there is no PCS boundary within the STP (no path, step 8-3) then the search task is scheduled for that STP in step 8—8. T, the search task activation time, is set to the start of the STP. In chips, this is expressed as T=NK. D, the search activation delay is set to zero since correlation can be performed on the mobile unit chips received during the system slot. N=coherent correlation length is set to 512, P=skipped PCGs is set to one, and M=correlation accumulation number is set to 8. PCG number=1 if the selected STP is within system PCG 1. PCG number=2 if the selected STP is within system PCG 2. Suppose that the selected STP is in system PCG2. This means that the search task is performed by executing a coherent correlation over 512 chips in the Kth STP of every second of the 16 PCGs starting at PCG 2 and these eight results are non-coherently combined. This task is then performed over a search window size W. The counter count2(K) is then incremented at step 8-9.

The position of the earlier and the later mobile PCS boundaries referenced to the system PCG can be calculated (in step 8-2A) in the same way as mentioned before. Ep=(L+3×384) modulo (PCG length in chips), Lp=L modulo (PCG length in chips)−1. If there is a PCS boundary within the STP (no path, step 8-3) a determination is made at step 8-4 of whether the later PCS boundary is within the STP or the earlier PCS boundary is within the STP.

If the earlier PCS boundary is within the STP (no path, step 8-4), then the search task can be scheduled to perform a correlation over a portion of mobile unit chips received prior to the PCS, but delayed to be performed during the Kth system slot. In step 8-6, the search task is scheduled for that STP. T, the search task activation time, is set to Ep−512. D, the search activation delay is set to NK−T since correlation cannot begin until the start of the STP which occurs at system time NK. As before, N=coherent correlation length is set to 512, P=skipped PCGs is set to one, and M=correlation accumulation number is set to 8. PCG number=1 if the selected STP is within PCG 1. PCG number=2 if the selected STP is within system PCG 2. Supposed that the selected STP is within PCG 1. This means that the search task is performed by executing a coherent correlation over 512 chips during the Kth STP of every second of the 16 PCGs starting at PCG 1 and these 8 results are non-coherently combined. This task is then performed over a search window size W. The counter count1(K) is then incremented at step 8-9.

If the later PCS boundary is within the STP (yes path, step 8-4), then the search task is not scheduled for that STP, and the process returns to step 8-2 for the selection of another STP with the next fewest number of tasks scheduled.

In the event a mobile unit transmits with the pilot channel of some power control groups gated off, search scheduling must be modified to avoid using mobile unit time during pilot channel gated off intervals. In the event the slot selected for scheduling overlaps with such a slot, then the next best slot should be selected. Alternatively, the process can begin by finding the PCG which is not gated off and selecting from that system slots which overlap or slightly follow that PCG the slot having the minimum number of search tasks scheduled. This may require that multiple search tasks be assigned to a single mobile unit in order to have sufficient overall correlation length. Alternatively, the overall search period can be extended. Furthermore, as W, the search window size changes, it may be necessary to adjust resource allocation. For example if W doubles, then two search task resources can be assigned to a given search task.

It is noted that for access searching or traffic preamble searching, there are no power control bits and as such these can always be scheduled during any system slot selected.

In the event some mobiles have gated off power control groups, some are involved in access attempts and preamble searching, and some are regular traffic channels with no gated off power control groups, a search prioritization can be performed by scheduling mobile units with gated off power control groups first, followed by regular traffic channels, followed by access attempts and preamble searching. This prioritization runs from the most restricted scheduling to the least restrictive scheduling.

Although the invention has been described such that sixteen or eight slots are selected, other correlation lengths may alternatively be employed.

What has been described is merely illustrative of the application of the principles of the invention. Other arrangements and methods can be implemented by those skilled in the art without departing from the spirit and scope of the present invention.

We claim:

1. A method of searching for multipath components of a CDMA signal, the method comprising:
    defining a plurality of search task periods with reference to a system time during a search period;
    for each correlation period of a plurality of correlation periods which are non-contiguous, selecting a respective search task period that corresponds to the correlation period;
    for each correlation period of the plurality of correlation periods, during the respective search task period, for each of a plurality or multipath delays within a search window determining a coherent correlation between a portion of the CDMA signal received during the correlation period and a portion of a known code offset by the multipath delay;
    combining non-coherently the coherent correlations determined for each multipath delay into a search statistic for that multipath delay.

2. A method according to claim 1 wherein consecutive ones of the plurality of correlation periods are each separated by a respective non-zero time interval.

3. A method according to claim 2 wherein the correlation periods are uniformly spaced.

4. A method according to claim 1 further comprising:
    for each correlation period, if the correlation period is earlier by a delay period than the respective search task period, buffering the portion of the CDMA signal received during the correlation period at least as long as the delay period.

5. The method of claim 1 wherein performing a correlation comprises:
    multiplying the CDMA signal received during a correlation period by the portion of the known code and by an orthogonal code which removes all components of the received signal except a pilot channel component.

6. The method of claim 1 wherein the CDMA signal comprises a pilot channel having pilot channel slots and power control slots defined with reference to a mobile unit time, mobile unit time being system time delayed by a round trip delay to the mobile unit, the method further comprising:
    selecting the search task periods corresponding with the correlation periods such that the search task periods do not overlap partially with any of the power control slots, and setting the correlation periods to equal the search task periods.

7. A method according to claim 1 wherein the CDMA signal comprises a pilot channel having pilot channel slots and power control slots defined with reference to a mobile unit time, mobile unit time being system time delayed by a round trip delay to the mobile unit, wherein the search task period is of the same duration as a power control slot, the method further comprising:
    for each search task period of the plurality of search task periods:
    if the search task period does not overlap partially with any power control slot, setting the corresponding correlation period to equal the search task period;
    if the search task period overlaps with an end portion of a power control slot, setting the corresponding correlation period to equal a period during which the power control slot is received; and
    if the search task period overlaps with a start portion of a power control slot, setting the corresponding correlation period to equal a period preceding a period during which this power control slot is received.

8. A method according to claim 1 wherein the CDMA signal comprises a pilot channel having pilot channel slots and power control slots defined with reference to a mobile unit time, mobile unit time being system time delayed by a round trip delay to the mobile unit, wherein the search task period has a different duration than a power control slot, the method further comprising:
    selecting the search task periods corresponding with the correlation periods such that the search task periods do not overlap with an end portion of any power control slot;

if the search task period does not overlap partially with any power control slot, setting the corresponding correlation period to equal the search task period;

if the search task period does overlaps with a start portion of any power control slot, setting the corresponding correlation period to equal a period preceding the start of the power control slot.

9. A method according to claim 6 further comprising:

selecting the search task periods corresponding with the correlation periods such that the search task periods do not overlap at all with any of the power control slots.

10. A method according to claim 1 further comprising:

grouping search task periods into power control groups of N consecutive search task periods each, where N≧2;

selecting the plurality of search task periods to include at most one search task period from each power control group.

11. A method according to claim 1 further comprising:

grouping the search task periods into groups of N consecutive search task periods each, where N≧2;

selecting the search task periods corresponding with the correlation periods to consist of an Mth search task period in every power control group, where 1≦M≦N.

12. A method of searching within a received signal for multipath components received from a plurality of mobile units, the method comprising:

for each mobile unit:

defining a plurality of search task periods with reference to a system time during a search period;

for each correlation period of a respective plurality of correlation periods which are non-contiguous, selecting a respective search task period that corresponds to the correlation period;

for each correlation period of the plurality of correlation periods, during the respective search task period, for each of a plurality of multipath delays within a search window determining a coherent correlation between a portion of a CDMA signal received during the correlation period and a portion of a respective known code for the mobile unit offset by the multipath delay;

combining non-coherently the coherent correlations determined for each multipath delay into a search statistic for that multipath delay for that mobile unit.

13. A method according to claim 12 wherein for each mobile unit, consecutive ones of the respective plurality of correlation periods are each separated by a respective non-zero time interval.

14. A method according to claim 12 wherein for each mobile unit, the respective plurality of correlation periods are uniformly spaced.

15. A method according to claim 12 further comprising:

for each mobile unit, for each correlation period of the respective plurality of correlation periods, if the correlation period is earlier by a respective delay period than the respective search task period, buffering the CDMA signal received during the correlation period at least as long as the respective delay period.

16. The method of claim 15 wherein for each mobile unit, each multipath component comprises a pilot channel having pilot channel slots and power control slots defined with reference to a respective mobile unit time, mobile unit time being system time delayed by a respective round trip delay to the mobile unit, the method further comprising:

for each mobile unit selecting the respective search task periods such that the search task periods do not overlap partially with any of the power control slots of that mobile unit, and setting the correlation periods to equal the search task periods.

17. A method according to claim 15 wherein for each mobile unit, each multipath component comprises a pilot channel having pilot channel slots and power control slots defined with reference to a respective mobile unit time, mobile unit time being system time delayed by a round trip delay to the mobile unit, wherein the search task period is of the same duration as a power control slot, the method further comprising for each mobile unit:

for each search task period of the respective search task periods for the mobile unit:

if the search task period does not overlap partially with any power control slot of that mobile unit, setting the corresponding correlation period to equal the search task period;

if the search task period overlaps with an end portion of a power control slot of that mobile unit, setting the corresponding correlation period to equal the period during which the power control slot is received; and if the search task period overlaps with a start portion of a power control slot of that mobile unit, setting the corresponding correlation period to equal a period preceding the power control slot.

18. A method according to claim 15 wherein for each mobile unit the respective multipath components comprises a pilot channel having pilot channel slots and power control slots defined with reference to a respective mobile unit time, mobile unit time being system time delayed by a round trip delay to the mobile unit, wherein the search task period has a different duration than a power control slot, the method further comprising for each mobile unit:

selecting the respective search task periods such that they do not overlap with an end portion of any power control slot of the mobile unit;

if the search task period does not overlap partially with any power control slot of the mobile unit, setting the corresponding correlation period to equal the search task period;

if the search task period does overlap with a start portion of any power control slot of the mobile unit, setting the corresponding correlation period to equal a period preceding the start of the power control slot.

19. A method according to claim 15 further comprising:

for each mobile unit, selecting the respective search task periods such that the search task periods do not overlap at all with any of the power control slots of the mobile unit.

20. A method according to claim 15 further comprising:

grouping search task periods into power control groups or N consecutive search task periods each, where N≧2;

for each mobile unit, selecting the respective search task periods to include at most one search task period from each power control group.

21. A method according to claim 15 further comprising:

grouping the search task periods into groups of N consecutive search task periods each, where N≧2; and for each mobile unit selecting respective search task periods to consist of the Mth search task period in every power control group, where 1≦M≦N.

22. A method according to claim 21 further comprising:

allowing a maximum of Q correlations to be determined during each group of Mth search task periods, Q≧1, and selecting the search task periods for mobile units accordingly.

23. A method according to claim 22 further comprising:
maintaining a count of how many correlations are to be determined during each search task period;
scheduling a new search by selecting the Mth search task periods with a minimum number of correlations to be determined.

24. A method according to claim 22 further comprising:
avoiding scheduling correlations for a mobile unit during correlation periods during which the mobile unit's pilot channel is gated off.

25. A searcher adapted to implement a method according to claim 1.

26. A searcher adapted to implement a method according to claim 12.

27. A base station adapted to implement a method according to claim 1.

28. A base station adapted to implement a method according to claim 12.

29. A computer readable medium having stored thereon instructions for causing a computing platform to execute a method according to claim 1.

30. A computer readable medium having stored thereon instructions for causing a computing platform to execute a method according to claim 12.

31. A searcher comprising:
a search engine capable of performing Q search tasks during each of a plurality of search task periods defined in local time, where $Q \geq 1$;
a scheduler adapted to schedule a search process for each of a plurality of known codes by selecting a respective plurality of search task periods during which the search engine is to execute a search task as part of the search process in a manner such that no more than Q search tasks are scheduled for any search task period;
a counter for each search task period maintained by the scheduler identifying how many search tasks have been scheduled for the search task period;
wherein the scheduler is adapted to schedule a new search process by selecting search task periods having fewer search tasks scheduled.

32. A searcher according to claim 31 wherein:
the search task periods are grouped into power control groups of N consecutive search task periods each, and wherein the scheduler is adapted to schedule a search process by selecting an Mth search task period of a plurality of the power control groups, where $1 \leq M \leq N$.

33. A searcher according to claim 32 further comprising:
a counter for each value of M identifying how many search tasks have been scheduled for the Mth search task period of a plurality of power control groups;
wherein the scheduler is adapted to schedule a new search process by selecting the Mth search task periods having fewest number of search tasks scheduled as indicated by the counters for the values of M.

34. A searcher according to claim 33 wherein:
the search engine is adapted to execute each search task by for each of a plurality of multipath delays within a search window determining a corresponding coherent correlation between a portion of the CDMA signal received during the correlation period and a corresponding portion of a known code offset by the multipath delay;
after executing all of the search tasks for a given search process, the search engine is adapted to combine non-coherently the coherent correlations determined for each multipath delay into a search statistic for that multipath delay.

35. A searcher according to claim 34 further comprising:
a buffer adapted to, for each correlation period, if the correlation period is earlier by a delay period than the corresponding search task period, buffer the CDMA signal received during the correlation period at least as long as the delay period.

36. A searcher according to claim 35 further adapted to search for known codes in CDMA signals which each have a respective pilot channel having pilot channel slots and power control slots defined with reference to a respective mobile unit time, the respective mobile unit time being system time delayed by a round trip delay to a respective mobile unit, the searcher further comprising, for each search process:
a timing circuit adapted to identify where power control slots are expected to occur in the received signal;
wherein the scheduler is adapted to select the search task periods corresponding with the correlation periods such that the search task periods do not overlap partially with any of the power control slots, and to set the correlation periods to equal the search task periods.

37. A searcher according to claim 35 further adapted to search for known codes in CDMA signals which each have a respective pilot channel having pilot channel slots and power control slots defined with reference to a respective mobile unit time, the respective mobile unit time being system time delayed by a round trip delay to a respective mobile unit, the searcher further comprising, for each search process:
a timing circuit adapted to identify where power control slots are expected to occur in the received signal;
wherein the scheduler is adapted to, for each search task period of the plurality of search task periods for each search process:
if the search task period does not overlap partially with any power control slot, set the corresponding correlation period to equal the search task period;
if the search task period overlaps with an end portion of a power control slot, set the corresponding correlation period to equal a period during which the power control slot is received; and
if the search task period overlaps with a start portion of power control slot, setting the corresponding correlation period to equal a period preceding a period during which this power control slot is received.

38. A searcher according to claim 35 further adapted to search for known codes in CDMA signals which each have a respective pilot channel having pilot channel slots and power control slots defined with reference to a respective mobile unit time, the respective mobile unit time being system time delayed by a round trip delay to a respective mobile unit, the searcher further comprising, for each search process:
a timing circuit adapted to identify where power control slots are expected to occur in the received signal;
wherein the scheduler is adapted to select the search task periods corresponding with the correlation periods such that the search task periods do not overlap with an end portion of any power control slot;
if the search task period does not overlap partially with any power control slot, set the corresponding correlation period to equal the search task period;
if the search task period does overlaps with a start portion of any power control slot, set the corresponding correlation period to equal a period preceding the start of the power control slot.

* * * * *

UNITED STATES PATENT AND TRADEMARK OFFICE
CERTIFICATE OF CORRECTION

| | | |
|---|---|---|
| PATENT NO. | : 7,113,538 B1 | Page 1 of 1 |
| APPLICATION NO. | : 09/702768 | |
| DATED | : September 26, 2006 | |
| INVENTOR(S) | : Xixian Chen et al. | |

It is certified that error appears in the above-identified patent and that said Letters Patent is hereby corrected as shown below:

Column 11, line 67, claim 1, "...plurality or multipath..." should be --...plurality of multipath...--.

Column 14, line 52, claim 20, "...groups or..." should be --...groups of...--.

Signed and Sealed this

Twenty-third Day of January, 2007

JON W. DUDAS
*Director of the United States Patent and Trademark Office*